June 6, 1961  H. A. SCHULZ  2,987,244

CROSSFOOTER CLEAR SENSING MECHANISM

Filed Dec. 6, 1957  3 Sheets-Sheet 1

INVENTOR.
HANS A. SCHULZ
BY *Wallace P. Lamb*

ATTORNEY.

INVENTOR.
HANS A. SCHULZ
BY Wallace P. Lamb
ATTORNEY.

June 6, 1961   H. A. SCHULZ   2,987,244
CROSSFOOTER CLEAR SENSING MECHANISM
Filed Dec. 6, 1957   3 Sheets-Sheet 3
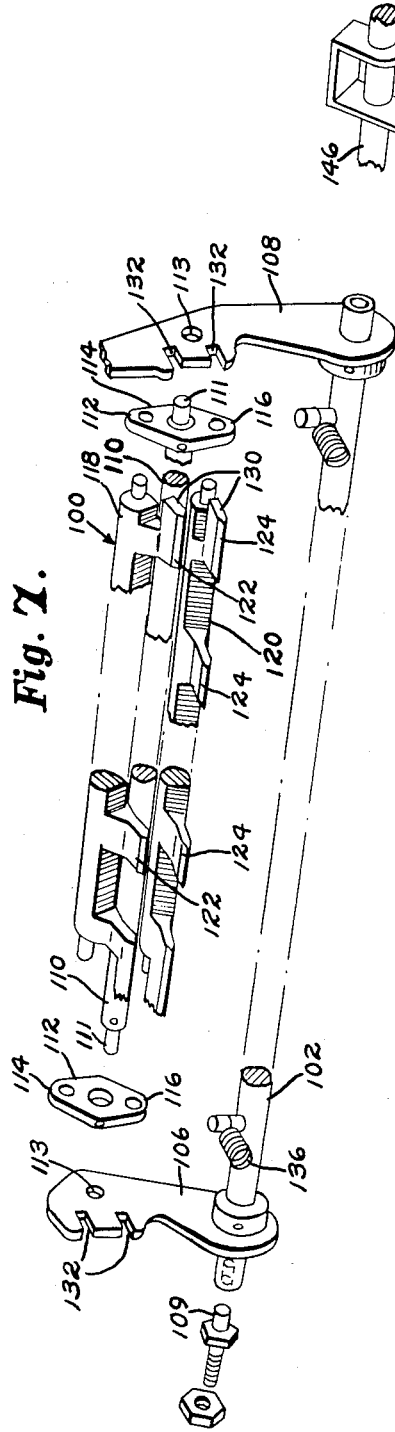
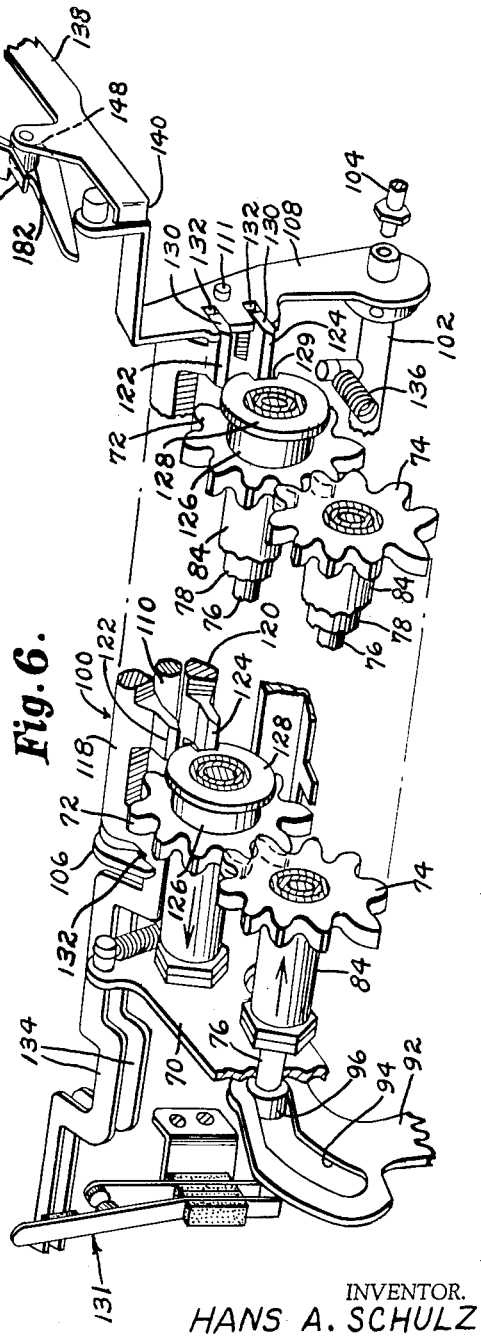
INVENTOR.
HANS A. SCHULZ
BY Wallace P. Lamb
ATTORNEY.

United States Patent Office 2,987,244
Patented June 6, 1961

2,987,244
CROSSFOOTER CLEAR SENSING MECHANISM
Hans A. Schulz, Detroit, Mich., assignor to Burroughs Corporaiton, Detroit, Mich., a corporation of Michigan
Filed Dec. 6, 1957, Ser. No. 701,002
3 Claims. (Cl. 235—60.2)

This invention relates generally to calculating machines of the type having a crossfooter and particularly to a non-clear signal system and sensing device responsive to conditions of the crossfooter.

It is an object of my invention to provide an improved crossfooter non-clear signal system responsive both to plus and negative amounts in the crossfooter of a calculating machine.

Another object of my invention is to provide an improved crossfooter sensing device of a character which will sense whether the crossfooter is clear and/or not clear with respect to either plus or minus amounts therein.

Another object of the invention is to provide an improved sensing device of the above mentioned character in which a pair of relatively movable sensing fingers are movable in response to a cam that in turn moves in accordance with changing amount conditions of the crossfooter.

Another object of the invention resides in the construction of the sensing device such that the sensing fingers, when moved into engagement with the crossfooter, condition indicating cam, will rock to impart operation of a signal.

A further object of the invention is to provide for a calculating machine crossfooter, an improved sensing device for sensing plus and minus, clear and non-clear conditions, which as a unitary structure may be readily assembled with and/or disassembled from the other components of the machine.

Other objects of the invention will be apparent from the following detail description, taken in connection with the accompanying drawings in which;

FIG. 6 is a fragmentary perspective view of the crossfooter and my sensing device associated therewith, and FIG. 7 is an exploded, perspective view of my sensing device.

Figure 1:
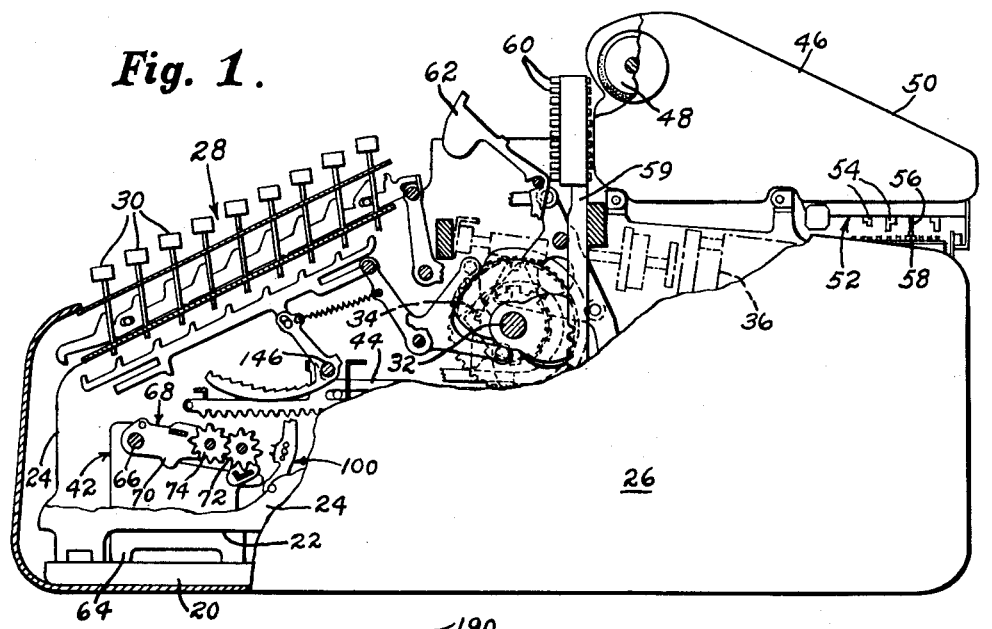
FIG. 1 is a side view, partly broken away and in section, of a calculating machine embodying features of my invention.

Referring to the drawings by characters of reference, the accounting or calculating machine shown in FIG. 1 is a well known type having the usual base 20 on which is mounted the main frame of the machine, designated generally by the number 22. The main frame 22 includes spaced upright side plates 24 on which most of the various mechanisms of the machine are mounted, the frame 22 and said mechanisms being enclosed by a housing 26. Adjacent the front of the machine is the usual keyboard 28 having rows of keys of which only a single row is shown, the row of keys shown being a row of amount indexing keys 30. Such machines, of course, have several rows of keys, including keys for taking subtotal and total operations, and a motor bar (not shown) for effecting cycling of the machine.

Figure 4:
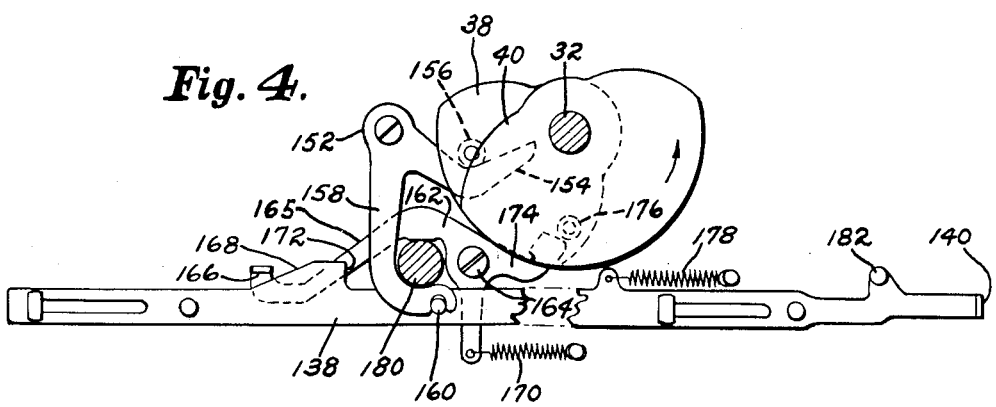
FIG. 4 is a fragmentary side view of certain operating details of the crossfooter.

Rearwardly of the keyboard 28 is a main cam shaft 32 from which most of the machine operations are effected, the shaft 32 being driven through a clutch 34 by an electric motor 36. On the shaft 32 are a number of cams for controlling operations of the machine, the only ones with which the present invention is concerned being cams 38 and 40, shown in FIG. 4.

Mounted on the base 20 below the keyboard 28, is a crossfooter 42 of a well known type that accumulates amounts indexed by the amount keys 30 when the machine is cycled, such as by operation of the motor bar. The amount keys 30 control the positions of slidable amount racks 44 which operate the crossfooter 42 in the well known manner.

Near the rear, and above the machine housing 26 is a carriage 46 for a printing platen 48, enclosed by a casing 50. As is well known, the carriage 46 is slidably mounted on the machine frame for travel transversely of the frame in accordance with the various operations of such machines. Carried by the carriage 46 on the underside thereof, is an accounting program device, designated generally by the numeral 52 which controls certain operations of the machine in accordance with the position of the carriage 46. In general, the program device 52 includes a plurality of depending sensing pins 54 which, among other things, controls the crossfooter in the performance of different functions, such as the taking of sub-totals, totals, etc. One of the pins 54 is designated by the numeral 56, and as will later be understood, controls my crossfooter nonclear signal system, hereinafter described, by closing a switch 58 (see FIG. 2) at the proper time.

Forwardly and adjacent the platen 48 is a conventional printing mechanism which includes a vertically movable printing head 59 having a plurality of print elements 60 that may be selectively poistioned in printing relation to the platen 48. Pivoted forwardly of the print elements 60 is a print hammer 62 to strike the selected print element to effect a printing operation in cooperation with the platen 48.

Figure 3:
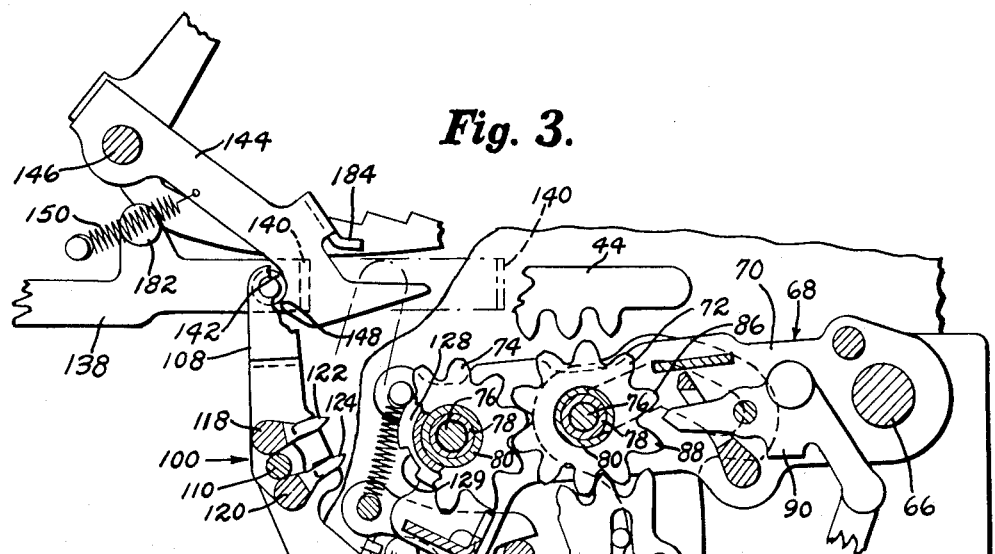
FIG. 3 is a fragmentary side view, partly in section, of a crossfooter of the machine.

The crossfooter 42 is operated by the amount racks 44 to accumulate or store the amounts indexed by the keys 30, so that sub-totals and totals may subsequently be taken. Preferably the crossfooter 42 is mounted on a support or frame including a pair of uprights or standards 64 that are rigidly mounted in the side plates 24 in spaced relation widthwise thereof. The standards 64 are rigidly secured together by a number of rods 66 which also function as fixed shafts for rotatably supporting various components of the crossfooter 42. One such component is the rockable crossfooter assembly, designated generally by the numeral 68, that includes a set of add and subtract pinions 72 and a set of total taking subtract pinions 74. The assembly 68 further includes spaced arms 70 pivoted on rod 66 and connected for rocking movement together by several connecting members, including a pair of spaced parallel rods 76. On each of the rods 76 is a tubular shaft 78 on which the pinions 72 and 74 rotate, the pinions preferably having bushings 80 and spaced apart by tubular spacers 84. As shown, pairs of the pinions 72 and 74 are in meshed relation, the pinions being arranged respectively below the amount racks 44 for operation thereby. As is the usual practice in crossfooters, the pinions 72 and 74 each have ten teeth corresponding to digit characters 0 to 9. With particular reference to FIG. 3, which shows the pinions 72 and 74 in zero positions, the teeth designated 86 are the "0" teeth and the longer teeth designated 88 are the "9" teeth. When the tooth 86 of pinions 72 is in the "9" position, and a plus amount is entered, the pinion 72 is rotated and its tooth 88 engages and pivots a lever 90 which through connecting linkage actuates a transfer mechanism 92 that transfers one digit to the next higher order pinion, as pinion 72 returns to zero position.

The pinion shafts 78 and consequently the pinions 72 and 74 thereon are shiftable longitudinally on their supporting rods 76 for the purpose of positioning either the add and subtract pinions 72 or the total taking subtract pinions 74 in positions for engagement by the racks 44. When shifting of the shafts 78 occurs, they are shifted in unison in opposite directions, the movement, of course, being insufficient to cause disengagement of the meshed pinions 72, 74. As is well known, shifting of the pinions 72, 74 is controlled in current calculating machines by a key operation or by the carriage 46 through interconnecting mechanism (not shown).

At a predetermined period during the cycling operation of the machine, the assembly 68 is rocked from its normally down position shown, upwardly to position the pinions 72 or 74, as the case may be, for engagement by the racks 44. The mechanism for rocking the assembly 68 is controlled by a key, and also by the carriage 46, by well known mechanism which may include a rockable cam 92 (see FIG. 6) having a cam slot 94 receiving a follower 96 on rod 76.

All of the above described devices and mechanisms are well known in the art and therefore have not been shown or described in detail. For a complete showing and description of the calculating machine, reference may be had to the patent to Thomas M. Butler, U.S. Patent No. 2,629,549.

Associated with the crossfooter 42 is my improved sensing device 100 for sensing a non-clear condition of the crossfooter 42 both for positive and negative amounts. This sensing device 100 is mounted on a rocker shaft 102 that is rotatably supported at its opposite ends on studs 104 which are secured in and to the opposite frame plates 24 of the machine. As shown, the rotatable shaft 102 is parallel with the shaft 78 of pinions 72, 74 and is disposed below and slightly rearward of the subtract pinions 74 (see FIG. 3). Fixed to the shaft 102 to rotate therewith is a pair of arms 106, 108 that are spaced apart longitudinally of the shaft 102 and extend upwardly therefrom. Pivotally mounted at its opposite ends on the arms 106, 108 is a second rocker shaft 110, the shaft having studs 111 at opposite ends thereof which are rotatably received in apertures 113 in arms 106 and 108 respectively (see FIG. 7). Secured to each end of the rocker shaft 110 to rotate therewith is a mounting member, or lever, 112 each of which has oppositely directed arms 114, 116 that extend lengthwise of the rocker arms 106, 108 in close proximity thereto. Extending between and supported by the mounting members 112 and thus supported by shaft 110, is a pair of elongated parallel sensing members 118, 120 of which the sensing member 118 senses the crossfooter pinions for positive amounts, and the sensing member 120 senses the pinions for minus amounts.

The sensing members 118 and 120 are individually pivoted at opposite ends thereof to corresponding arms of the pair of levers 112, the arrangement being such that the rocker shaft 110 extends parallel with and between the sensing members 118, 120 with the axes of the shaft and sensing members in substantially the same plane. At this point, it should be noted that the sensing members 118, 120 are pivotal about the axis of rocker shaft 110 and are also pivotal relative thereto on the levers 112 and to each other, providing cooperative, but individual movement of the sensing members.

Each of the sensing members 118, 120 includes a plurality of similar sensing fingers 122, 124 respectively, which are spaced apart longitudinally of the sensing members and may be integral therewith, as shown. The sensing fingers 122, 124 extend laterally from their axes of rotation, the fingers 122 being directly above the fingers 124 such that there are a plurality of pairs of the fingers with each pair comprising an upper positive sensing finger and a lower negative sensing finger. A pair of these sensing fingers 122, 124 is provided for each pair of the meshed pinions 72, 74. At their opposite ends, the sensing fingers 122 and 124 are provided with opposite end extensions 130 which, like the fingers, are of blade-like configuration and engage in slots 132 in the rocker arms 106 and 108. The extensions 130 have loose fits in the slots 132 so that the sensing fingers may pivot in opposite directions, limited by the sides of the slots 132.

Each of the pinions 72 is provided with a hub 126 on which there is a cam 128 having its center of rotation concentric with the pinion shaft 78. The cam 128 constitutes a movable member that moves or rotates in accordance with rotation of the pinions 72 and thus the position of each of the cams 128 is indicative of the amount position of its pinion 72. The cams 128 are arranged such that the sensing fingers 122, 124 will engage the cam surfaces when the sensing device 100 is rocked toward the cams during the sensing operation.

Preferably, the cams 128 each have a substantially uniform surface interrupted only by a slot which provides a recessed surface portion 129 for sensing by the fingers. The recessed surface 129 of each cam 128 is located to correspond to a clear condition of its respective pinion 72 and is arranged for engagement by either the positive sensing fingers 122 or the negative sensing fingers 124, as the case may be. For example, following a total taking operation, the sensing fingers 122 will engage the cam recessed surfaces 129 if the amount in the crossfooter at the time of total taking is a positive amount, and the crossfooter is cleared of the positive amount. If, however, the amount in the crossfooter is negative at the time of total taking, and the amount is cleared from the crossfooter, the negative sensing fingers 124 will engage the recessed cam surface 129. In either event, the sensing members 118 will be caused to rock about the axis of shaft 110 and this movement is transmitted to open a normally closed switch 131. To this end, each of the sensing members 118 is provided with a switch operator 134 in the form of extensions that extend in parallel relation from the left ends of the sensing members 118, facing FIG. 6. If neither the positive sensing fingers 122, nor the negative sensing fingers 124 engage the cam recessed surface 129, a non-clear condition is indicated. When this occurs, the fingers 122, 124 of one or more pairs thereof will engage the uniform surface of the cam or cams 128 imparting no movement to the sensing members 118. As a consequence, switch 131 will remain closed when the crossfooter is non-clear.

Any suitable mechanism may be used to rock the sensing device into and out of sensing relationship with the cams 128. In the present machine the sensing device is urged toward the cams 128 by tension springs 136 which are overcome by mechanism including a timing slide 138, which operates to pivot the sensing device 70 to the retracted position of the sensing device shown in FIG. 3. The slide 138 is provided on one end thereof with an abutment 140 in the path of engagement with a stud 142 carried by the upper end of the sensing device arm 108. The springs 136 may have ends thereof attached to arms on shaft 102 and have their other ends anchored to the standards 64 of the crossfooter assembly. A pawl 144, pivoted on a shaft 146 is adapted to latch the sensing device in retracted position, the pawl 144 having a latching shoulder 148 engageable with the stud 142 that is carried by the arm 108. A coil spring 150 urges the pawl 144 into latching engagement with the stud 142. The slide 138 is operated by the timing cams 38 and 40 on main cam shaft 32, interconnected by a bell crank lever 152. Lever 152 has a cam arm 154 engageable by a stud 156 on cam 38 and has a depending arm 158 provided with a hooked end engaging a stud 160 carried by the slide 138. A latch 162, pivoted at 164 is provided to latch the slide 138 in its rearward position following retraction of the sensing device by the slide. The latch 162 has an arm 165 provided with a lug 166 on the end thereof which on movement of the slide 138 rearwardly, or to the left, facing FIG. 3, rides up an incline 168 on the upper edge of the slide and is swung down by the influence of a spring 170 to engage a shoulder 172 on the slide to lock the slide in retracted position. The latch 162 has a second arm 174 which is adapted to be depressed by engagement therewith of a stud or roller 176 carried by cam 38. When cam 38 pivots latch 162, the slide 138 will be released and will be moved forward by a spring 178. Movement of the latch 162 by the spring 170 is limited by a stop 180.

Figure 5:
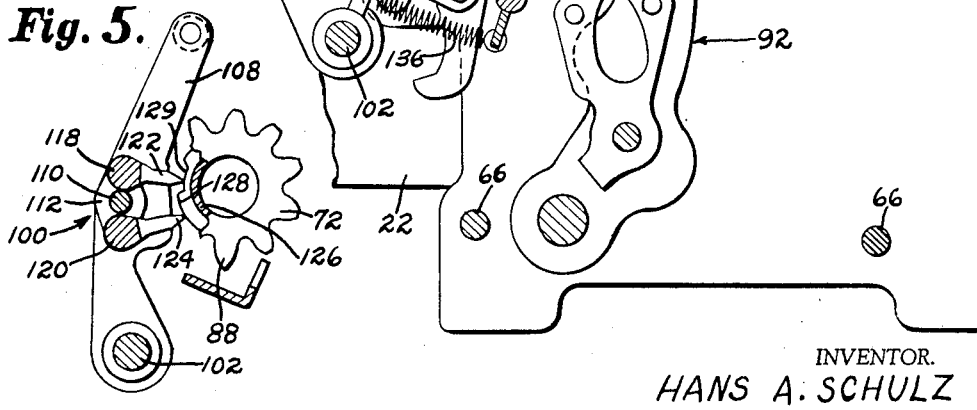
FIG. 5 is a detail end view partly in section of a crossfooter sensing device.

The position of the sensing device shown in FIG. 5 is the normal position in which thes ensing fingers 122, 124 are in engagement with the cams 128 prior to cycling of the machine. When cycling of the machine is initiated, such as by depression of the motor bar, cam 38 pivots lever 152 and moves the slide to the left (FIG 4), which retracts the sensing device 100, moving it to the retracted position shown in FIG. 3. In this position, the pawl latch 144 is in latching engagement with the stud 142 on arm 108 to hold the sensing device 100 in latched position, and latch stud 166 is behind shoulder 172 holding the slide 138 in retracted position. Following retraction of the sensing device 100, the amounts are entered into the crossfooter which is raised to be engaged by the racks 44 and amounts are being transferred from one order of pinion to the next higher by the transfer mechanism 92. When the machine cycle is near completion, stud 176 on the cam 38 engages and actuates latch 164 to release slide 138. Slide 138 is then shifted forwardly or to the right, facing FIG. 4, by the spring 178. As the slide 138 moves forwardly, a roller 182 carried by the slide engages a cam 184 on pawl latch 144 moving the latch upwardly, and thereby releasing arm 108 of the sensing device 100. The sensing device 100 is now rocked toward the cams 128 by the springs 136 until the fingers 122, 124 engage the cam surfaces. This occurs each cycle of operation of the machine including the total taking cycle when the sensing fingers 122, 124 will function to sense whether the machine crossfooter is clear or not clear, as the case may be.

In order to indicate to the machine operator, whether the crossfooter 70 is clear or not clear, a signal 188 (see Fig. 2) is provided and controlled by the sensing fingers 122, 124. The signal 188 may be of any suitable type, such as the electric lamp shown. The lamp 188 may be connected in circuit with the sensing device operated switch 131 and the carriage operated switch 58 as shown. In series with switches 131 and 58 is a source of electric power 190. A second signal 192 in the form of a lock may be provided to prevent operation of the machine, if the crossfooter 70 is not clear. The lock 192 is operatively connected to the conventional clutch tripping mechanism of the machine and is actuated by a solenoid 194 that is connected in series with the switches 131 and 58. It will be apparent that if the machine will not operate following an operation that should clear the crossfooter 70, the machine operator immediately knows that a mistake has been made in the entries which, of course, must be corrected before proceeding further.

Figure 2:
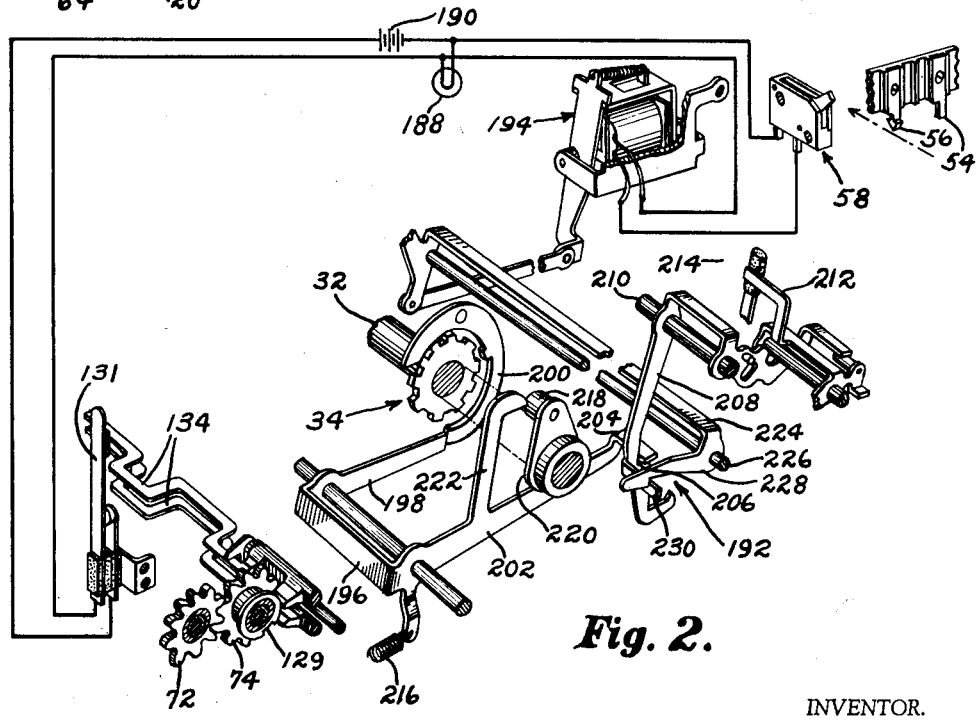
FIG. 2 is a fragmentary perspective view of my crossfooter non-clear signal system including certain components of the machine.

The clutch tripping mechanism includes a yoke type lever or bail 196 having an arm 198 arranged such that its end may be swung into position to abut a clutch component 200 of clutch 34 to disengage the clutch at the end of each cycle of operation of the machine. A second arm 202 of the bail 196 has a lug 204 which normally rests on a shoulder 206 on a lever 208, pivoted on a shaft 210. The lever 208 is connected by suitable linkage to a switch arm 212 of which only an upper end portion is shown, the arm 212 engaging an electric insulator 214. The switch is of a well known type (shown and described in the above mentioned Butler patent) for controlling operation of the machine driving motor 36. When the parts of the devices of FIG. 2 are in the normal positions shown, and a machine cycling operation is initiated, the latching lever 208 is swung clockwise which releases the bail lever 196 which is then swung down by a spring 216, which allows the clutch component 200 to engage the other of the components of clutch 34 to connect the main cam shaft 32 to the driving motor 36. On completion of the cycle of operation, the bail 196 is relatched with arm 208 by mechanism including a stud 218 on an arm 220 cooperable with an arm 222 on bail 196.

The second signal or lock 192, comprises a bail type lever 224 pivoted on a shaft 226 adjacent lever 208, the lever 224 having a latch arm 228 cooperable with a lug 230 on the arm 208. The latch arm 228 is shown in its normal or released position from which it may be swung down into latching engagement with lug 230. When this occurs, lever 208 is prevented from pivoting clockwise and bail 202 is locked in the position shown, in which the end of arm 198 abutting the end of clutch component 200 prevents engagement of the clutch components.

*Operation*

In operation, when an operator of the machine initiates a cycle operation to perform a total taking operation for example, the switch 212 is closed and lever 208 pivots clockwise to release bail 196 which then pivots clockwise to allow clutch 34 to engage. Engagement of clutch 34 connects the cam shaft 32 to the motor 36 and the carriage 46 is moved thereby to the total taking position, and the slide 138 is drawn rearwardly moving the sensing device 100 to the retracted position of FIG. 3, in which position the device is held by latch 144. Also, the crossfooter pinions 72, 74 are rotated by their respective racks 44 and digits transferred by the transfer mechanism from the lower to the higher orders as amounts are continued to be entered in the crossfooter. During this time, the sensing device 100 is being held in its retracted position shown in FIG. 3, by the latch 144, out of the way of the crossfooter pinions 72, 74. When cam 38, approaching completion of the cycle of operation, reaches the point where the stud 176 carried thereby pivots latch 144 and releases slide 138, the slide moves forwardly and in so doing allows springs 136 to pivot the sensing device into sensing relation with the crossfooter pinions 72, 74. If the crossfooter pinions are clear of amounts, that is, are all in zero positions, then either the positive sensing fingers 122 or the negative sensing fingers 124 will engage the recessed portions 129 of the cams 128, depending upon whether the balance in the crossfooter was a positive or negative balance. In either event, the sensing fingers 122, 124 will rotate and open switch 131 to break the circuit of the signal 188 and of the solenoid operator of signal 192. In the event the crossfooter is not clear, the sensing fingers 122, 124 will both engage the uniform surfaces of the cams 128 which of course, imparts no rocking movement to the fingers with the result that the switch 131 remains closed and both the light signal 188 and the clutch trip lock signal 192 are rendered effective. When the circuit is closed, the signal lamp is energized to warn the operator of a non-clear condition of the crossfooter and in addition, the solenoid 194 is energized to move the latching lever 228 into locking engagement with the lug 230 of lever 208. The latching lever prevents release by lever 208 of the bail 196 which is thus held in the position shown, preventing engagement of the components of clutch 34. The operator is thus warned that there is a mistake in the balance that should be corrected before proceeding further.

From the foregoing description it will now be understood that I have provided for a calculating machine, a system for signalling the machine operator whether the crossfooter of the machine is clear or not clear following a totalizing operation. It will be seen that when the machine carriage moves to the totalizing position, one of the two signal controlling switches is closed and that the other remains closed if any amount, either positive or negative, remains in the crossfooter with the result that the circuit of the signal is closed. It will also be appreciated that I have provided an improved sensing device of a character having both positive and negative sensing members which are movable together and relative to each other in sensing the condition of a calculating machine crossfooter.

What is claimed is:

1. In a calculating machine having a crossfooter including a plurality of numeral pinions of successive decimal orders, a sensing device for sensing a clear or non-clear condition of the crossfooter comprising, a plurality of cams respectively rotatable with said pinions, each of said cams having a recessed surface portion representative of zero, a support, a pair of spaced rocker arms pivoted on said support and pivotal from a retracted position toward the crossfooter cams, a rotatable shaft pivotally mounted at its opposite ends on said arms, said shaft having its longitudinal axis parallel to the axis of rotation of said cams, a pair of mounts on said shaft respectively adjacent said arms and pivotal with said shaft, a pair of rods parallel to said shaft and pivotally supported on said mounts in radially spaced relation, pairs of sensing fingers for respectively sensing said cams, having corresponding ones of said pairs of fingers being carried by one of said rods and the other corresponding ones of said pairs of fingers carried by the other of said rods, said sensing fingers to sense said cams on rocking of said arms to said cams, only one of said sensing fingers of each pair engageable with the recessed portions at the same time, and cooperable means on said rods and rocker arms limiting pivoting of each of said sensing fingers in opposite directions.

2. A sensing device for sensing clear or non-clear conditions of a calculating machine crossfooter comprising, a rotatable shaft, a pair of spaced arms fixed to said shaft, a second shaft carried by and pivoted at its opposite ends on said arms, a mount fixed to each end of said second shaft, a pair of parallel rods, said second shaft extending parallel with and between the said rods, said rods journaled at opposite ends thereof for relative rotation on said mounts, and pairs of longitudinally spaced sensing fingers integral with and extending laterally from said rods, corresponding one of the pairs of sensing fingers carried by one of said rods and the other corresponding ones of the pairs of sensing fingers carried by the other of said rods.

3. In a calculating machine having a crossfooter including a plurality of numeral pinions of successive decimal orders, a sensing device for sensing a clear or non-clear condition of the crossfooter comprising, a plurality of cams respectively rotatable with said pinions, each of said cams having a recessed surface portion representative of zero, a support, a pair of spaced rocker arms pivoted on said support and pivotal from a retracted position toward the crossfooter cams, a rotatable shaft pivotally mounted at its opposite ends on said arms, said shaft having its longitudinal axis parallel to the axis of rotation of said cams, a pair of mounts on said shaft respectively adjacent said arms and pivotal with said shaft, a pair of rods parallel to said shaft and pivotally supported on said mounts in radially spaced relation, pairs of sensing fingers for respectively sensing said cams and having corresponding ones of said pairs of fingers carried by one of said rods and the other corresponding ones of said pairs of fingers carried by the other of said rods, said sensing fingers to sense said cams on rocking of said arms to said cams, only one of said sensing fingers of each pair engageable with the recessed portions at the same time, cooperable means on said rods and rocker arms limiting pivoting of each of said sensing fingers in opposite directions, parallel extensions on ends of said rods and switch operating cams carried by said extensions.

References Cited in the file of this patent

UNITED STATES PATENTS

| | | |
|---|---|---|
| 1,490,129 | Poole | Apr. 15, 1924 |
| 1,490,989 | Sieweck | Apr. 22, 1924 |
| 2,048,568 | Seymour | July 21, 1936 |
| 2,106,273 | Fleming | Jan. 25, 1938 |
| 2,195,606 | Toggenburger | Apr. 2, 1940 |
| 2,339,616 | Chase | Jan. 18, 1944 |
| 2,629,549 | Butler | Feb. 24, 1953 |
| 2,665,064 | Sharpe | Jan. 5, 1954 |